(No Model.)  2 Sheets—Sheet 1.
C. H. BARTLETT.
CURRYCOMB.
No. 522,578.  Patented July 10, 1894.
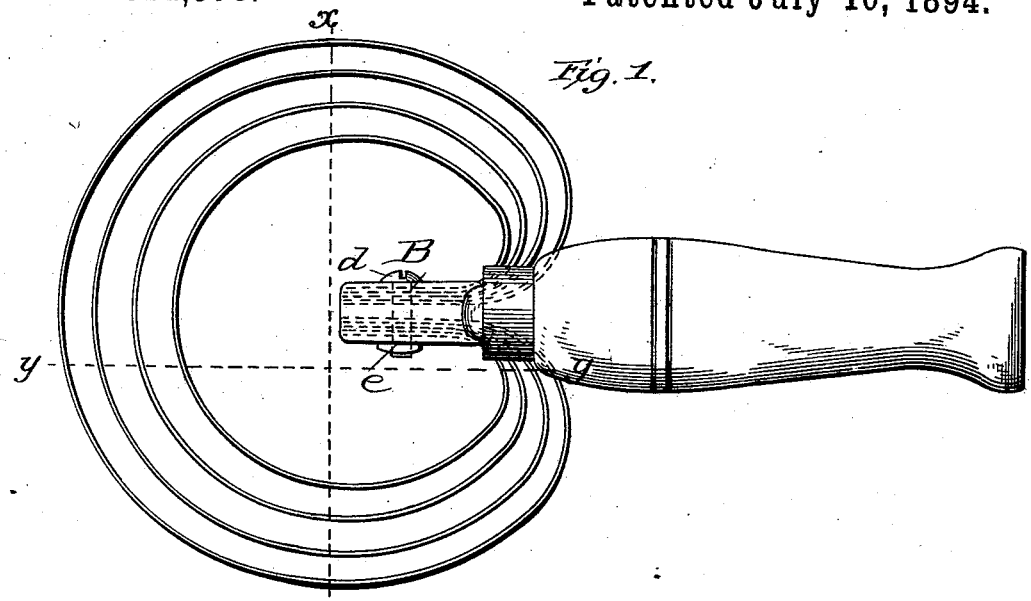
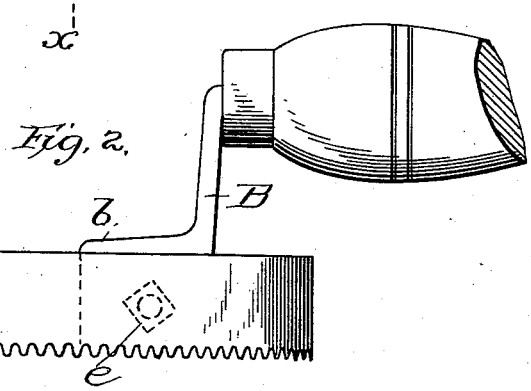
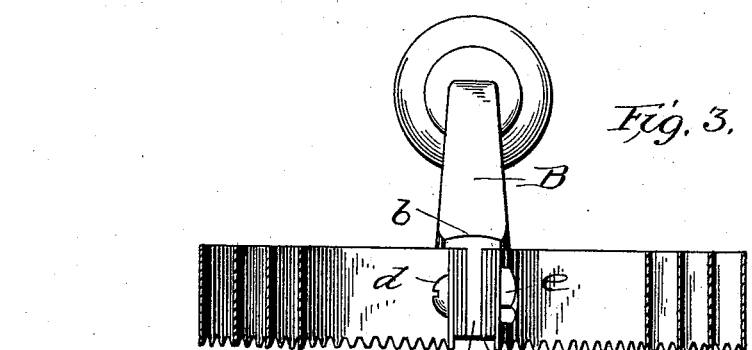
Attest  
Walter Donaldson  
F. L. Middleton
Inventor  
Charles H. Bartlett  
by Ellis Spear  
Atty.
THE NORRIS PETERS CO., PHOTO-LITHO., WASHINGTON, D. C.

(No Model.)   C. H. BARTLETT.   2 Sheets—Sheet 2.
CURRYCOMB.

No. 522,578.　　　　　　　　Patented July 10, 1894.

Attest
　Mattern Mulleton
　F. L. Middleton

Inventor
Charles H. Bartlett
by Ellis Spear
　　Atty.

UNITED STATES PATENT OFFICE.

CHARLES H. BARTLETT, OF SOUTH BEND, INDIANA, ASSIGNOR TO THE SPRING CURRY COMB COMPANY, OF SAME PLACE.

CURRYCOMB.

SPECIFICATION forming part of Letters Patent No. 522,578, dated July 10, 1894.

Application filed January 18, 1894. Serial No. 497,266. (No model.)

*To all whom it may concern:*

Be it known that I, CHARLES H. BARTLETT, a citizen of the United States of America, residing at South Bend, in the county of St. Joseph and State of Indiana, have invented certain new and useful Improvements in Currycombs, of which the following is a specification.

My invention is an improvement in curry combs of that class shown in the United States patent of Du Shane, granted to James Du Shane on the 16th day of July, 1889, and having the Serial No. 407,313. In the form of comb shown in said patent the very desirable quality of flexibility is secured and the whole serrated edge is utilized, but owing to the mode of securing the blades to the handle shank they sometimes break in use. I have sought to remedy this without diminishing the flexibility or toothed surface.

My invention is shown in the accompanying drawings, in which—

Figure 4:
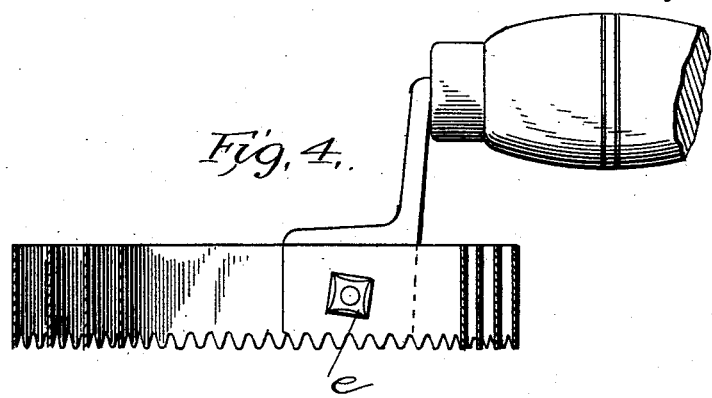
Figure 5:
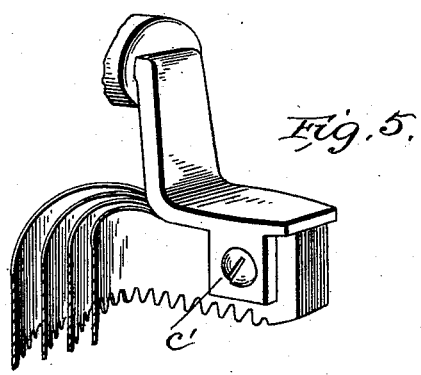
Figure 6:
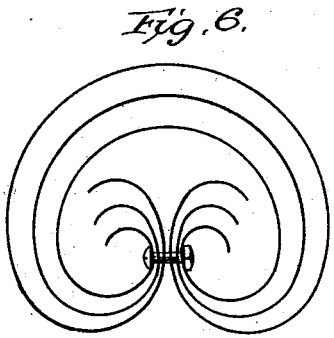
Figure 7:
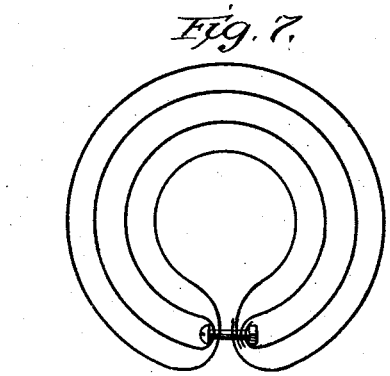

Figure 1, is a plan view. Fig. 2, is a side elevation, and Fig. 3, a section on line $x$—$x$ of Fig. 1. Fig. 4, is a section on line $y$—$y$ of Fig. 1. Fig. 5, is a modification. Figs. 6 and 7 represent modifications.

In the drawings an ordinary handle is represented, in which is fixed a shank B, the lower end of which is turned in a line parallel with the handle and is laterally extended in the form of a flat bar $b$ from the central portion of which depends a tongue $c$. It is thinner than the flat bar from which it depends, so as to leave shoulders on each side against which the blades or strips bear. These blades, as shown in the drawings, are four in number, but they may be more or less. They are composed of flat strips of thin steel serrated on one edge, the blades all varying in length so that one may be placed inside of the other, when bent in the proper shape, but all of the same width. The blades are bent in an approximately circular form, except that the ends are turned inward and are lapped upon each other, those of the inner blade, having the shortest curve or bend and each next succeeding to the outside, having a larger bend or bent on a larger curve. The ends of all the blades are adapted to lap one upon the other. They are perforated as is also the downwardly projecting lug or tongue $c$. The blades are put one within another as shown in Fig. 1, and the relative sizes are such, that a space is left between adjacent blades. The blades diverge from the lapping point to the rear and the toothed portion of the blades extends from front to rear, so that the connection to the handle shank is at or near the center with the tooth portion of the blades forming nearly complete circles around this approximately central point of attachment. The blades are held together and to the lug of the handle shank by means of a rivet or bolt $d$, having a nut $e$, the upper edges of the lapping parts of the blades bearing upon the shoulders of the horizontal part of the shank. The teeth of the outer blades are cut away on the inner lapping ends as at $x$ Fig. 3, so that only the teeth of the inner blade remain, these being sufficient for the work.

Instead of the central lug with the blade ends lapping on each side of it, I may use one or two side lugs as $c'$, $c'$ against or between which the lapped ends of the blades are held by the same bolt, as shown in Fig. 5.

The spring of the blades is enlarged in scope from the rear to the front of the comb, and the handle has a secure attachment near the center. The blades in this construction yield directly from the point of attachment and without torsion, and therefore are less liable to break in use.

In Fig. 6 I have shown a modified form of the comb in which the ends of the blades are extended in toward the center of the comb filling the central space and it will be obvious that any number of blades may be used in a comb of this construction.

Fig. 7 shows another mode of attaching the blades to the handle.

Having thus described my invention, what I claim, and desire to secure by Letters Patent, is—

1. A curry comb composed of serrated spring blades bent approximately into the form of a circle, with the ends turned inwardly, the blades being arranged one within the other with the ends lapping, said lapping ends being secured to the handle, substantially as described.

2. A curry comb composed of serrated spring blades bent approximately into the form of a circle and arranged one within another with ends bent inwardly and secured to the handle, substantially as described.

In testimony whereof I affix my signature in presence of two witnesses.

CHARLES H. BARTLETT.

Witnesses:
LEIGHTON PINE,
WEBSTER L. STOVER.